US006797033B2

(12) United States Patent
Doubrava et al.

(10) Patent No.: US 6,797,033 B2
(45) Date of Patent: Sep. 28, 2004

(54) METHOD FOR RECOVERING CATALYTIC METALS

(75) Inventors: Jeffrey Doubrava, Cutchogue, NY (US); Anthony Gallegos, St. Charles, IL (US); Eric G. Lundquist, North Wales, PA (US); James C. Bohling, Lansdale, PA (US); Richard F. Staniunas, Northboro, MA (US); Chad Serell, Sag Harbor, NY (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 10/301,075

(22) Filed: Nov. 21, 2002

(65) Prior Publication Data
US 2003/0209106 A1 Nov. 13, 2003

Related U.S. Application Data
(60) Provisional application No. 60/332,281, filed on Nov. 21, 2001.

(51) Int. Cl.[7] .............................. C22B 3/22; C22B 11/00
(52) U.S. Cl. .............................. 75/426; 75/427; 75/428; 75/429; 75/430; 75/432; 75/714; 75/743; 75/744
(58) Field of Search .......................... 75/426, 427, 428, 75/429, 430, 432, 714, 743, 744

(56) References Cited

U.S. PATENT DOCUMENTS

| 2,863,760 A | 12/1958 | Ashley et al. |
| 3,011,920 A | 12/1961 | Shipley, Jr. |
| 3,532,518 A | 10/1970 | D'Ottavio et al. |
| 4,020,009 A | 4/1977 | Gulla |
| 4,085,066 A | 4/1978 | Gulla |
| 4,120,819 A | 10/1978 | Small |
| 4,164,481 A | 8/1979 | Ma et al. |
| 4,223,173 A | 9/1980 | Manziek |
| 4,227,899 A | 10/1980 | Meny et al. |
| 4,240,909 A | 12/1980 | Manziek |
| 4,260,493 A | 4/1981 | Kretas et al. |
| 4,261,738 A | 4/1981 | Valentine et al. |
| 4,279,644 A | 7/1981 | Friar et al. |
| 4,311,811 A | 1/1982 | Manziek |
| 4,311,812 A | 1/1982 | Manziek |
| 4,355,140 A | 10/1982 | Manziek |
| 4,371,436 A | 2/1983 | Farber |
| 4,410,665 A | 10/1983 | Manziek |
| 4,420,401 A | 12/1983 | Kretas et al. |
| 4,435,258 A | 3/1984 | Melka, Jr. et al. |

(List continued on next page.)

FOREIGN PATENT DOCUMENTS

| CA | 224 741 | 8/1985 |
| WO | WO 94/03649 | 2/1994 |

OTHER PUBLICATIONS

"Reclamation of Palladium from Colloidal Seeder Solutions", Research Dislcosure Jun. 1990, No. 31448, Disclosed Anonymously, pp. 493.

(List continued on next page.)

Primary Examiner—Melvyn Andrews
(74) Attorney, Agent, or Firm—John J. Piskorski

(57) ABSTRACT

A method for recovering catalytic metals from fluids containing catalytic metal colloids. Fluid compositions such as rinse solutions or dragout baths containing catalytic metal colloids are passed through a filter that entraps catalytic metal colloids on the filter. The catalytic metal colloids have a high affinity for the filter in contrast to other components of the fluids. The other components of the fluids pass through the filter while the catalytic colloids concentrate on the filter. The filter containing the catalytic metal colloids is burned, and the catalytic metal is retrieved. The method is economically efficient and environmentally friendly.

8 Claims, 1 Drawing Sheet

U.S. PATENT DOCUMENTS

| | | | |
|---|---|---|---|
| 4,593,016 A | | 6/1986 | Amelio et al. |
| 4,600,699 A | * | 7/1986 | Courduvelis ................. 502/24 |
| 5,009,965 A | | 4/1991 | Feldstein |
| 5,047,563 A | | 9/1991 | Denton et al. |
| 5,213,895 A | | 5/1993 | Hirai et al. |
| 5,247,078 A | | 9/1993 | Champion et al. |
| 5,302,183 A | | 4/1994 | De Boer et al. |
| 5,304,233 A | | 4/1994 | Awadalla et al. |
| 5,914,195 A | | 6/1999 | Hori et al. |
| 6,147,225 A | | 11/2000 | Gaboury et al. |
| 6,169,045 B1 | | 1/2001 | Pike et al. |
| 6,267,871 B1 | * | 7/2001 | Weakly et al. .............. 205/742 |
| 6,555,010 B2 | * | 4/2003 | Barrett ....................... 210/710 |

OTHER PUBLICATIONS

Ezawa et al., "Extraction and Recovery of Prescious Metals from Plating Solutions Using Molecular Recongnition Technology", IBC Advanced Technologies, Inc., Apr. 2000, pp. 1–15.

Fang et al., "Improvements in the Recovery of Palladium From Reprocessing Waste of Spent Nuclear Fuel Reported Earlier", Journal of Radioanalytical and Nuclear Chemistry, Articles, vol. 189, No. 1 (1995), pp. 59–63.

Article entitled "Precious Metals, Platinum Group Can be Recovered With Hydrometallurgy", American Metal Market, Jul. 6, 1983, pp. 13.

Draye et al., "Selective Extraction of Palladium from Acidic Nitrate Solutions with Thiamacrocycles–synergized dinonylnaphthalenesulfonic Acid Systems", Journal of Radioanalytical and Nuclear Chemistry, vol. 220, No. 1(1997), pp. 105–107.

Guyon et al., "Lipophilic Polythiamacrocycles as Palladium Extracting Agents", Tetrahedron vol. 51, No. 14, pp. 4065–4074, 1995.

Letowski et al., "Platinum and Palladium Recovery From Spent Catalysts by Aluminum Chloride Leaching", Proceedings of the International Symposium on Recycle and Secondary Recovery Metals and the Fall Extractive and Process Metallurgy Meeting Sponsored by the Physical Chemistry Committee of the Metallurgical Society of AIME held in Fort Lauderdale, Florida, Dec. 1–4, 1985, pp. 735–745.

Saito et al., "Synthesis of Thiacrown Ether Carboxylic Acids and Their Characteristics as Extractants for Metal Ions", Analytica Chimica Acta 299 (1994), pp. 137–144.

Godlewska–Zylkiewicz et al., "Ion–Exchange Preconcentration and Separation of Trace Amounts of Platinum and Paladium", Analytical Letters, 33(13) pp. 2805–2820 (2000).

* cited by examiner

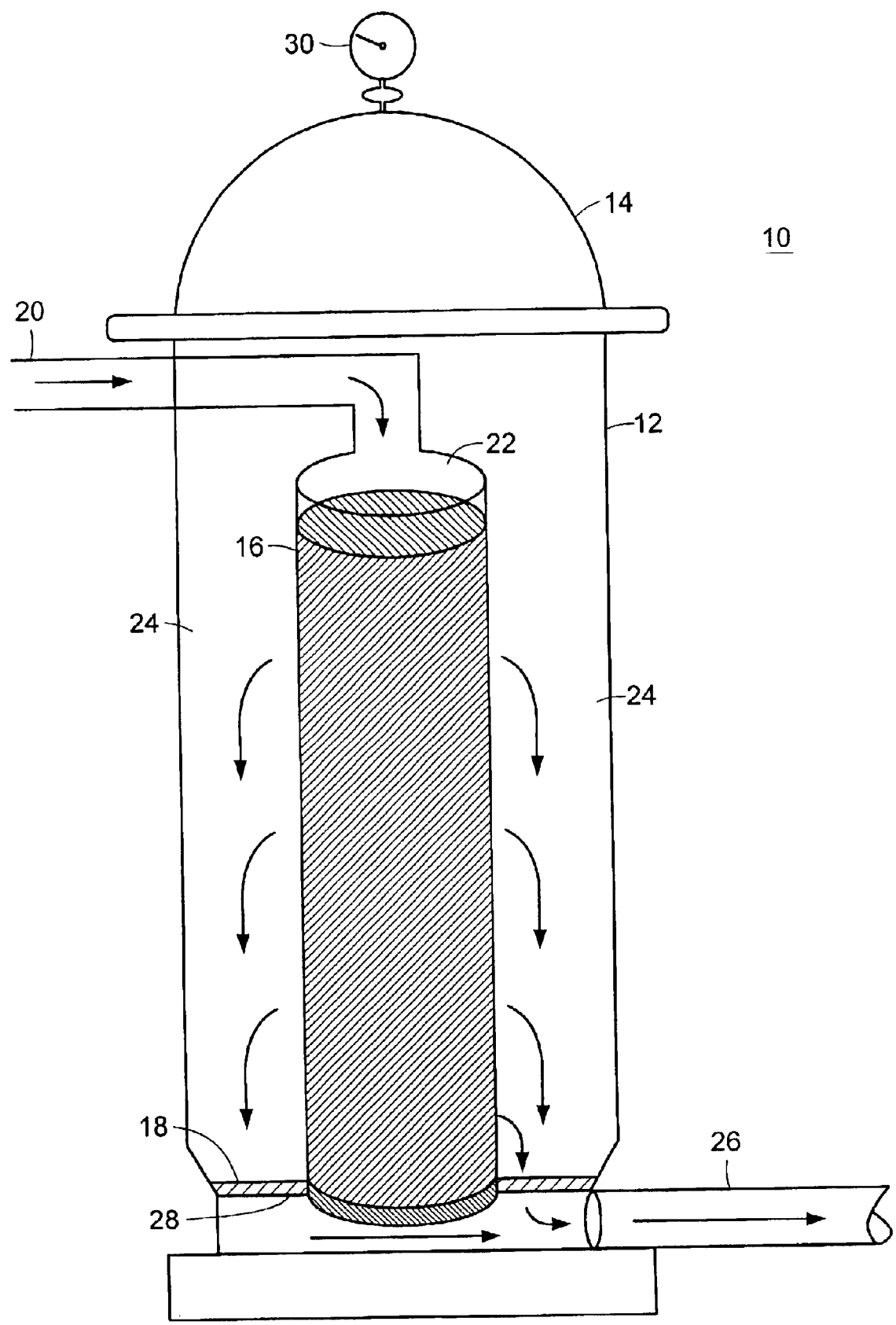

METHOD FOR RECOVERING CATALYTIC METALS

This application claims the benefit of U.S. Provisional Application No. 60/332,281 filed on Nov. 21, 2001.

BACKGROUND OF THE INVENTION

The present invention is directed to a method of recovering catalytic metals. More specifically, the present invention is directed to a method of recovering catalytic metals from fluid compositions containing catalytic metal colloids.

Electroless metal deposition refers to the chemical deposition of a metal on a conductive, non-conductive, or semi-conductive substrate in the absence of an external electric source. Electroless deposition is used for many purposes, for example, in the manufacture of printed circuit boards where, in one method, an electroless metal, often copper, is deposited on a dielectric substrate either as a uniform surface coating or in a predetermined pattern. The initial electroless copper deposit is thin and may be further built up by electroplating or may be deposited directly to full thickness.

The substrate over which an electroless metal deposit is formed is often a plastic panel which may have a metal foil such as copper laminated to one or both of its surfaces, for example, with adhesive, to form a metal clad substrate. Where both surfaces of the substrate are to be used, connections are provided therebetween by means of holes through the panel at appropriate locations. The walls of the holes are made conductive with electroless coating.

The electroless deposition of a metal on either a metallic or non-metallic substrate requires pretreatment or sensitization of the substrate to render it catalytic to reception of a metal deposit. Catalytic metal colloids are often used as the sensitizer or seeder to prepare the substrate for reception of the metal.

Catalytic metal colloids are dispersions formed by the admixture of a catalytic metal ion and a non-catalytic metal ion in an amount in excess of the catalytic metal ion. Such dispersions are often formed in acidic solutions but also may be formed in alkaline solutions. Suitable catalytic metal ions are well known in the art. Examples of highly desirable catalytic metal ions are the noble metal ions of gold, platinum and palladium. An example of a suitable non-catalytic metal ion used to form the metal colloid is stannous ion. Colloidal baths or solutions may contain tin in amounts of from about 10 to about 50 or more times than the amount of catalytic metal. Typically, a catalytic metal such as palladium may range in concentrations of from about 140 ppm to about 150 ppm in the colloidal bath. Such catalysts are commercially available. U.S. Pat. No. 3,011,920 to Shipley, Jr. discloses methods of making such catalysts, the disclosure of which is hereby incorporated in its entirety herein by reference. Also, U.S. Pat. Nos. 4,020,009 and 4,085,066 both to Gulla and assigned to Shipley Company, Inc. disclose catalytic metal colloids and methods of making the same, the disclosures of which are hereby incorporated in their entireties herein by reference.

Prior to electroless metal deposition on a substrate, such as a printed circuit board, the part of the substrate to be plated is immersed in a colloidal bath or solution. The substrate is then rinsed with water and then placed in an electroless bath for plating. About 70% or more of the catalyst consumed by the substrate during immersion is washed off of the substrate by the rinse or dragout bath. Thus, about 30% or less of the catalyst remains on the substrate. The catalytic metal colloids represent a major cost in electroless metal deposition. Thus, recovering the catalytic metal colloids for reuse is highly desirable. However, recovery of the catalytic metal from the rinse or dragout bath is difficult because the catalytic metal is in small concentrations and the non-catalytic metal, such as tin, is present in large concentrations. Thus, the rinse is often discarded with the loss of the valuable catalytic metal.

In addition to the loss of catalytic metal from rinses, catalytic metals also may be lost from the catalytic metal colloidal solutions or baths. For example, when employing copper clad substrates, such as printed circuit boards, which are drilled to provide through-holes, the through-holes are metal plated to provide a continuous current path when individual boards are joined together. Because the exposed surfaces in the holes are non-metallic, electroless plating techniques including the step of catalyzing by means of a catalytic metal colloid, such as tin/palladium colloid catalyst, is employed. Copper clad boards are immersed in the catalytic bath to deposit the catalyst thereon. Copper from the copper clad boards contaminates the catalytic metal colloidal bath with continued use of the bath. When the contamination reaches an extent such that the bath becomes ineffective or the electroless plating becomes less adherent than desirable, the bath is "spent" and is then discarded as waste.

Because many of the metals employed in the catalytic metal colloids are costly, especially gold, platinum and palladium, industries, such as the printed circuit board industry, would prefer to recover the metals rather than dispose of them. Recovery of the metals would reduce manufacturing costs to manufacturers of printed circuit boards and reduce costs to the manufacturers' customers. Also, the catalytic metals present a hazard to the environment, and disposal of the metals is strictly regulated by the Federal and State governments. Often large volumes of liquid waste are transported far distances to designated sites for proper disposal. Thus, proper disposal procedures for the metals are costly to the industry and much of the cost is passed onto the customer. Although recovery of catalytic metals from catalytic metal colloids is highly desirable, an economically efficient method for the recovery of the catalytic metal from colloids has not been developed. Accordingly, there is a need for an economically and environmentally safe method for recovering catalytic metals from colloidal metal catalysts.

A few attempts have been made to recover catalytic metals from waste solutions. U.S. Pat. No. 4,435,258 to Milka, Jr. et al. and assigned to Western Electric Co., Inc. discloses a method of recovering palladium from spent electroless catalytic baths employing an electrolytic cell. The method of recovery disclosed in the '258 patent involves (a) dissolving tin/palladium colloid in a spent catalytic bath with an oxidizing agent such as hydrogen peroxide to form a true solution; (b) heating the bath to a temperature and for a time sufficient to essentially remove excess hydrogen peroxide; (c) placing the solution in an electrolytic cell having (1) a nickel anode, and (2) a cathode composed of a metal or metallic surface, such as copper or nickel, for the palladium to be deposited; and (d) electrodeposition of palladium from the solution onto the cathode at a voltage that allegedly tends to minimize and substantially reduce tin deposits. There are many disadvantages with such a method. Electrolytic cells can be costly. The consumer of the palladium colloid either has to invest in purchasing such electrolytic cells, or pay the cost of transporting the spent catalytic bath to a site where the electrolytic cell is located. Because of the weight of fluids, the cost of transporting the bath to the recovery site is expensive. If the consumer purchases the electrolytic cell, then the consumer must expend funds in both operating and maintaining the cell. Such an electrolytic cell as described in the '258 patent is specially designed and replacement of worn parts may not be inexpensive or readily obtainable. For example, the electrolytic cell of the '258 patent has a specially designed cascading structure to allegedly prevent deposited palladium from breaking away from the cathode. Also, a high purity nickel anode and cathode are recommended to obtain acceptable recovery amounts of palladium. Such adds to the cost of the apparatus. Amounts of palladium recovered also depend on the amounts of specific components in the colloidal bath as well as any contaminants. The more dilute the palladium and the more contaminants in the bath the more difficult the recovery of the palladium. Such contaminants as copper salts or other metal contaminants may compete for deposition at the electrodes with the palladium. Several palladium colloidal catalysts are obtainable from commercial sources and the specific components and purity vary. Thus, the efficiency of such electrolytic cells may vary. Another problem associated with such electrolytic cells is duration of operation. High recovery of palladium by an electrolytic cell often requires many hours of operation. Such long hours of operation increase the cost of recovering catalytic metal and add wear to the electrolytic cell.

Research Disclosure 31448 (anonymous, June 1990) entitled "Reclamation of Palladium from Colloidal Seeder Solutions" discloses a method of recovering palladium from colloidal tin/palladium solutions used to promote electroless metal depositions. The palladium is recovered by flocculating the colloid by rapid mixing with air or oxygen. The oxygen allegedly does not oxidize the palladium. A palladium rich precipitate is allegedly obtained. The precipitate is dried and further processed. The document is silent on the further processing of the precipitate to recover the palladium as well as the efficiency of the disclosed method. The document only mentions that the method is intended to eliminate costly trucking of the hazardous waste from the colloidal solutions.

U.S. Pat. No. 5,302,183 to De Boer et al. and assigned to Shell Oil Company discloses a method of recovering precious metals such as platinum and palladium from non-aqueous effluents in colloidal and/or dissolved states. Such effluents are from non-aqueous effluents leaving flow-through reactors or bleed streams from a stripping reactor, not from aqueous solutions of colloidal catalysts or aqueous rinses as employed in the circuit board industry. The non-aqueous colloidal metal and/or dissolved metal effluents may be initially distilled to remove unwanted reaction product in the effluent. The non-aqueous effluent also may be dried to remove any water or the effluent may be filtered. The patent is silent on the specific method or efficiency of the filtering method. If the aforementioned steps are eliminated, the non-aqueous effluent may be immediately reduced with a reducing agent. The reducing agent is added to the non-aqueous effluent to complete reduction of any cationic precious metals present in the non-aqueous effluent. Suitable reduction agents are carbon monoxide and lower olefins such as ethylene. The reducing agents are contacted with the non-aqueous effluent in a gaseous state.

After reduction, the reduced precious metal is deposited on a support such as activated carbon or porous granular plastic or resin. The reduced precious metal deposited on the support may be recovered by filtration, decanting, centrifugation or the support may be burned and the precious metal transported to the appropriate facilities for further processing.

Although the '183 patent alleges a high recovery of precious metal from the disclosed process, the process suffers from a number of disadvantages. First, the reducing step employs expensive technological equipment such as gas chambers to apply the reducing agent in gaseous form to the non-aqueous effluent. Such a step involves transporting the non-aqueous effluent to a facility having such equipment, or the purchase and maintenance of such equipment by the workers where the non-aqueous effluent is recovered. Additionally, trained workers are employed in the operation of the equipment used in the reducing step adding to the cost of the process. Thus, the reduction step is costly. Further, carbon monoxide is a preferred reducing gas. Carbon monoxide gas is very toxic and presents a hazard to workers performing the reduction process. The other reducing agent, i.e., the lower olefins, also may present a hazard to workers. For example, ethylene presents a serious flammability problem. Additionally, the '183 patent is limited to recovering precious metals only from non-aqueous effluents.

Adsorbents such as resins are known in the art to be used for recovering precious metals from aqueous solutions. A paper entitled "Extraction and Recovery of Precious metals from Plating solutions Using Molecular Recognition Technology" by S. R. Izatt et al. discloses the use of SuperLig® 127 resin for selectively recovering potassium gold cyanide from dragout rinse solutions, and SuperLig® 2 resin for recovering palladium metal from dipping baths. SuperLig® resins are proprietary crown ether resins obtainable from IBC Advanced Technologies Inc., of American Fork, Utah. A disadvantage in the method for recovering potassium gold cyanide by the method using SuperLig® 127 resin is that a concentrator with a vacuum and a heat exchanger is employed to concentrate the potassium gold cyanide from dragout rinse solutions to a concentration of 16 g/l. Such apparatus adds to the cost of the process. A disadvantage of both the potassium gold cyanide and the palladium recovery processes is the limiting of the recovery processes to the use of a specific proprietary resin. A worker practicing the method is restricted to using a specific proprietary resin without an alternative material for recovering the metals. Thus, the method is inflexible for the worker. Also, such resins are costly to manufacture and often require skilled workers to operate the resins and maintain them. Another problem with employing resins, in general, is that the resins may become fouled with salts, non-catalytic metals and undesirable precipitated solids during the recovery process. Thus, the resins have to be regenerated or replaced with new resins to continue the recovery process. The added step of regenerating the resins delays the recovery process. Also, some of the catalytic metal mixed with the materials that foul the resin may be lost during regeneration. Replacing the fouled resin with new resin adds to the cost of the recovery process. Accordingly, there is a need for a more economic and flexible method for recovering catalytic metals.

U.S. provisional patent application serial No. 60/262,592 filed Jan. 18, 2001 discloses an efficient method of recovering catalytic metals from solutions containing catalytic metal colloids. The method involves recovering catalytic metal colloids from solutions by capturing the colloids on a filter as a precipitate followed by washing the precipitate with an oxidizing agent until the catalytic metal is removed from the filter. The catalytic metal is recovered in a separate container and then collected on an adsorbent. The adsorbent is burned and the catalytic metal is retrieved. The filters used to collect the catalytic metal colloid are disposed of. Although the method provides an efficient means of recovering catalytic metal, there is still a need for an improved method.

SUMMARY OF THE INVENTION

The present invention is directed to a method of recovering catalytic metals from a fluid containing catalytic metal colloids by concentrating the catalytic metal colloids as a precipitate on a filter followed by burning or incinerating the filter containing the catalytic metal colloids, and then retrieving the catalytic metals.

Advantageously, the method of the present invention provides an economically efficient means of recovering catalytic metals for reuse. Filtering the catalytic metal colloid species from a fluid concentrates the catalytic metal colloid as a precipitate from many other components of the fluid that may interfere with catalytic metal recovery or increase both the time and expense for recovery. Such other components may be various salts, contaminants from printed wiring boards, and the like.

Catalytic metal colloids are employed in compositions used in metal deposition processes. Such metal deposition compositions include electrolytic and electroless solutions, i.e., solutions capable of the chemical deposition of an adherent metal coating on a conductive, non-conductive, or semi-conductive substrate in the absence of an external electric source. The part of the substrate to be plated with a metal is contacted with a catalytic metal colloid solution or bath to coat the substrate with the colloid. The catalytic metal colloid acts as a seeder for metal deposition on the substrate. The substrate may then be placed in a metal plating solution for metal deposition. The substrate may be rinsed a number of times during the process. Some of the catalytic colloid is carried away in the rinse. Such rinse solutions are also known as dragout baths. Because the catalytic metal colloids represent a major cost of operating metal deposition processes, recovering the catalytic metal from rinse solutions is highly desirable. Filtering such rinse solutions captures and concentrates the catalytic metal colloids as a precipitate on the filter. The filter allows much of the excess plating metals, metal salts, soluble non-catalytic metal from the colloid, complexing ions, reducing agents, alkali metal salts, pH adjusters, brighteners, stabilizers, and other components in the rinse solutions to pass through the filter. Thus, the filtering step provides a rapid and efficient means for concentrating and recovering catalytic metal colloids. The filter with the catalytic metal colloids is burned and the catalytic metal is retrieved.

The method of the present invention is highly desirable for any industry where catalytic metal colloids are employed. The printed circuit board industry, where catalytic metal colloids are employed in metal deposition processes, especially benefits from the recovery method of the present invention. Expensive catalytic metals may be readily recovered without additional expensive equipment or complex time consuming steps. Further, the filtering process may be performed at the site where the catalytic metal colloids are employed, and the process does not require highly skilled workers. Thus, the method of recovering catalytic metals is economically efficient.

Additionally, the method of the present invention is environmentally friendly. The method of the present invention provides a high recovery of catalytic metals that are potentially hazardous to the environment. Also, the filtered catalytic metal colloids may be transported to another site for further processing without the expense or danger of spillage as with large volumes of hazardous fluid.

A primary objective of the present invention is to provide a method for recovering catalytic metals from fluids containing catalytic metal colloids.

Another objective of the present invention is to provide a method of recovering catalytic metals from a catalytic metal colloid solution by an economically efficient means.

A further objective of the present invention is to provide a method for recovering catalytic metals from a catalytic metal colloid solution that is environmentally friendly.

Additional objectives and advantages of the present invention may be ascertained by those of skill in the art by reading the detailed description of the invention and the appended claims.

BRIEF DESCRIPTION OF THE DRAWING

FIGURE is a schematic of an apparatus with a filter that may be employed to practice the present invention.

DETAILED DESCRIPTION OF THE INVENTION

The present invention is directed to a method of recovering catalytic metals from fluids containing catalytic metal colloids. Fluids or solutions containing the catalytic metal colloids are contacted with a filter that captures and concentrates the catalytic metal colloids as a precipitate. Filtering provides a rapid and efficient means of recovering catalytic metal colloids from fluids. Much of the precipitated solids are composed of catalytic metal and non-catalytic metal that composes the colloid. Other components in the fluid or solution pass through the filter leaving the catalytic metal colloids as a precipitate concentrated on the filter. After the catalytic metal colloids are entrapped on the filter, the filter is burned or incinerated to ash, and the catalytic metal is retrieved by any suitable method in the art. The ash from incineration contains catalytic metal oxides, non-catalytic metal oxides and burnt residue of the filter. Destroying the filter with the catalytic metal colloids, such as by incineration, eliminates steps of removing catalytic metals from the filter using potentially hazardous compounds such as oxidizing agents. Eliminating oxidizing steps prevents the potentially unsafe practice of repeatedly stripping filters with oxidizing mixtures of, for example, hydrochloric acid and hydrogen peroxide. Additionally, by burning the filters, catalytic metal recovery is greater than 90% by weight of the catalytic metal from the fluid. Catalytic metal recovery using the method of the present invention may be greater than 95% by weight. Using the method of the present invention to recover catalytic metals from a fluid may provide a catalytic metal recovery of as high as about 98% to about 100% by weight of the catalytic metals in the fluid. The term "about 100% by weight" means from 99% by weight to 100% by weight.

Catalytic metal colloids are dispersions of catalytic metal ions in combination with non-catalytic metal ions in excess of the catalytic metal ions. The non-catalytic metal ions reduce the catalytic metal ions, and a dispersion of solid particles is formed in solution. Such solutions may be aqueous or non-aqueous. In the printed wiring board industry, the solutions are predominantly aqueous. Such catalytic metal colloids are well known in the art. Catalytic metals include, but are not limited to, copper, beryllium, aluminum, tungsten, tellurium, nickel, gold, platinum, palladium, silver, germanium, molybdenum, selenium, rhodium, osmium, iridium, ruthenium, lead and magnesium. Preferred metal catalysts are the noble metals such as gold, platinum and palladium with palladium the most preferred. Non-catalytic metals admixed in excess with the catalytic metals include, but are not limited to, stannous ions. Such non-catalytic metal is employed in the catalytic metal colloid in amounts of from about 10 to about 50 times greater than the amount of catalytic metal. Sometimes the amount of non-catalytic metal exceeds 50 times the amount of catalytic metal in the colloid. Preferred colloidal catalysts are tin/palladium, tin/platinum and tin/gold with tin/palladium the most preferred. U.S. Pat. Nos. 3,011,920; 4,020,009; and 4,085,066 disclose a number of catalytic metal colloids and methods of making them, the disclosures of which are hereby incorporated herein in their entirety by reference.

Any suitable filter may be employed to filter the catalytic metal colloid particles from a fluid or solution as long as the filter entraps and concentrates the catalytic metal colloids, and allows other components in the solution to pass through the filter, or the other components are at least easier to remove from the filter material than the catalytic metal colloids. Surprisingly, catalytic metal colloids adhere to a wide variety of materials allowing the catalytic metal colloids to be entrapped and concentrated on the filter material while allowing unwanted components to pass through the filter material. Such unwanted components are components that can interfere with the efficient and optimum recovery of the catalytic metal. Advantageously, the solids filtration step concentrates precipitated catalytic metal colloid on a filter. Materials that are in solution and that pass through the filter include, but are not limited to, plating metals such as copper, nickel and the like; soluble non-catalytic metal; reducing agents such as formaldehyde or sodium hypophosphite; alkali metal salts such as sodium and potassium salts; complexing agents such as primary, secondary, tertiary, quaternary amines, various carboxylic acids and various amino acids; pH adjusters such as sodium carbonate, sodium bicarbonate, sodium hydroxide, ammonium hydroxide and acetic acid; brighteners; and stabilizers or surfactants. Such metals, salts and various other materials compose a greater part of solutions from which the catalytic metals are recovered. Thus, the materials remaining on the filter as a precipitate are predominantly catalytic metals and non-catalytic metals that compose the colloid. The catalytic metals may compose from about 0.0001% by weight to about 0.05% by weight of such solutions. Such dilute solutions include, but are not limited to, rinse solutions or dragout baths collected from substrates treated with catalytic metal colloid baths, or any solution, especially an aqueous solution, containing catalytic metal colloids.

For example the part of the substrate to be plated with a metal is contacted with a catalytic metal colloid solution or bath to coat the substrate with the colloid. Suitable substrates include, but are not limited to, printed circuit or wiring boards. The catalytic metal colloid bath seeds the substrate with the catalytic metal colloid for electroless plating. Such solutions may contain a catalytic metal chloride such as palladium chloride; stannous chloride; and hydrochloric acid to acidify the solution and the balance water. Examples of other components of catalytic metal colloid baths include sodium stannate; platinum chloride; gold chloride; formaldehyde; sodium chloride; sodium citrate; and sodium hydroxide. Such baths are high in concentrations of stannous and stannate ions, and sodium and chloride ions in contrast to the amount of catalytic metal. Such ions may comprise from about 15% to about 30% by weight of the bath with much of the remaining weight water. The baths may be acidic or alkaline. The pH of the bath may range from about 1.0 to about 9.0. After the substrate is contacted with the catalytic metal colloid solution, the substrate is rinsed with water and the rinse or dragout is collected for filtering. The rinse from the substrate contains many of the components included in the bath in addition to the catalytic metal colloid and some catalytic metal not associated with the colloid. The catalytic metal colloid is recovered by filtering the rinse to entrap and concentrate the catalytic metal colloid as a precipitate on the filter. When the colloid is a tin/palladium colloid, the precipitate contains mainly palladium as $Pd^\circ$ and tin as $Sn^{2+}$ with some $Sn^{4+}$. The catalytic metal colloid surprisingly has a high affinity for the filter. Palladium metal in such dilute rinse solutions range, for example, from about 1 ppm to about 8 ppm. The other components from the rinse do not have as high an affinity for the filter and most of the other components pass through. The filter with the entrapped catalytic metal colloid may be rinsed with water as needed to remove any unwanted bath components that may be retained on the filter such as surfactants and the like.

Suitable filters include, but are not limited to, thermoplastic polymer materials, hydrophilic materials, inorganic materials such as activated carbon, silica gel, alumina, silica-alumina, silicon carbide and zirconium silicate; organic materials, such as polystyrene and polystyrene derivatives. Diatomacious earth and pumice and the like also can be employed. Resins such as styrenic-based resins, acrylic based resins, crown ethers and the like also may be employed. However, resins are preferably employed as adsorbents as discussed below. Examples of suitable resins that may be obtained commercially are the Amborane® resins such as Amborane® 345 and 355; Amberlite® resins such as Amberlite® IRA-75 and IRA-400, and Ambersorb® (all obtainable from Shipley Company, Marlborough, Mass.). The different filters may be employed individually or in combination.

Examples of suitable thermoplastic polymer materials include, but are not limited to, polyolefins such as polyethylene, polypropylene, polybutylene, and copolymers thereof; polyamides such as nylon 6, nylon 6/6, nylon 10, nylon 12 and the like; polyesters such as polythylene terephthalate, polybutylene terephthalate and the like; polycarbonate; polystyrene; thermoplastic elastomers; polyurethane; and blends and copolymers thereof.

Examples of suitable hydrophilic materials include, but are not limited to, high molecular weight polymers such as vinyl polymers such as polyvinyl alcohol, vinyl alcohol-ethylene copolymer, polyvinyl pyrrolidone, polyhydroxyethyl acrylate, polyhydroxyethyl methacrylate, polyamide acrylate and the like; cellulose derivatives such as hydroxyethyl cellulose, hydroxypropyl cellulose, and the like; polymer saccharides such as chitin, chitosan, alginic acid, and the like; gelatin and the like.

Examples of suitable resins include, but are not limited to, nonionic borane reducing resins. Such resins may be acrylic based amine-borane reducing resins, polystyrene based amine-borane reducing resins, acrylic based phosphine-borane reducing resins, or polystyrene based phosphine-borane reducing resins. Such resins and methods of making the same are disclosed in U.S. Pat. Nos. 4,240,909; 4,223,173; 4,311,812; 4,311,811; 4,355,140; and 4,410,665 all assigned to Rohm and Haas Company, the disclosures of which are hereby incorporated herein in their entireties by reference.

Examples of suitable crown ethers include, but are not limited to, lipophilic thiacrown ethers such as 2-octyl-1,4,7-trithiacyclononane; 2-octyl-1,4,7-trithiacyclodecane; 2-octyl-1,4,7,10-tetrathiacyclododecane; 6-octyl-1,4,8,11-tetrathiacyclotetradecane; 3-octyl-1,5,9,13-tetrathiacyclohexadecane; 2,11-dioctyl-1,4,7,10,13,16-hexathiacyclooctadecane; 2,15-dioctyl-1,4,7,10,13,16-hexathiacyclooctadecane and the like. Such lipophilic thiacrown ethers are disclosed in "Lipophilic Polythiamacrocycles as Palladium Extracting Agents", by Guyon et al., *Tetrahedron*, Vol. 51, No. 14, pp. 4065–4074, 1995. Also, thiacrown ether carboxylic acids may be employed. Examples of such thiacrown ether carboxylic acids include, but are not limited to, 3,6,10,13-tetrathiacyclotetradec-1-oxyacetic acid (TTCTOAA); and 2-(3,6,10,13-tetrathiacyclotetracec-1-oxy)hexanoic acid (TTCTOHA). The synthesis of such ethers is disclosed in "Synthesis of Thiacrown Ether Carboxylic Acids and Their Characteristics as Extractants for Metal Ions", Saito et al., *Analytica Chimica Acta*, 299, pp. 137–144, 1994. Other suitable thiacrown ether compounds that may be employed to filter catalytic metal colloids include, but are not limited to, thiacrown polyacrylamide, thiacrown polyacrylic acid, thiacrown polyhydroxypropylacrylate and the like. Such polymeric thiacrowns are disclosed in U.S. Pat. No. 6,147,225 to Gaboury et al. and assigned to Betzdearbom Inc., the entire disclosure of which is hereby incorporated herein by reference.

Other crown ethers that may be employed include the chiral crown ethers such as the optically active isomers of bis (12-crown-4 methyl) dialkyl malonates. Such crown ethers are disclosed in U.S. Pat. No. 5,047,563 to Denton et al. and assigned to Miles Inc., the entire disclosure of which is hereby incorporated herein by reference. Diaza crown ethers such as diaza-18-crown-6-ether (DA18C6) also may be employed. The diaza crown ethers and the methods of making the same are disclosed in U.S. Pat. No. 5,247,078 to Champion et al. and assigned to Texaco Chemical Company, the entire disclosure of which is hereby incorporated herein by reference. When ethers are employed, they are preferably bonded to a solid support such as a polystyrene or silica gel support.

Preferred filters are the thermoplastic polymers and the hydrophilic materials. The most preferred are the polyolefins such as polyethylene, polypropylene, polybutylene and copolymers thereof, cellulose derivatives such as hydroxyethyl cellulose, hydroxypropyl cellulose, chitin, chitosin, alginic acid and gelatin. Such filters are preferred because catalytic metal colloids have a high affinity for such thermoplastic and hydrophilic materials and unwanted solution components such as salts readily pass through the membrane structure of the filter. Thus, additional washing or rinsing steps to remove unwanted components that are adsorbed to the filter are avoided or reduced. Additional rinsing steps applied to the filter may result in unwanted loss of some of the catalytic metal from the filter. Further, the structural membranes of such thermoplastic and hydrophilic filters do not collapse when contacted with salts causing the loss of catalytic metal colloids as with some resin materials. Also such filters are cost effective because they are less costly to manufacture than resins, and do not require skilled workers to use them. Such filters have a mean pore size of from about 0.05 $\mu$m to about 10.0 $\mu$m, a pore size highly suitable for retaining catalytic metal colloids. One type of thermoplastic filter that is commercially available is Whatman® polycap HD 1 micron filter paper composed of monofilaments of anisotropic polypropylene (MAPP) in a polypropylene housing (obtainable from Whatman Company, catalog No. 6703–7510). Another commercially available filter is the Polypro® filter which is a polypropylene filter manufactured by Mitsubishi Kaesi Corporation.

The filters may be employed by any suitable means or in any suitable apparatus to filter the catalytic metal colloid from a composition or solution. To achieve a recovery of catalytic metal, flow rates may vary depending upon the size of the filter employed as well as the material composition of the filter. For example, solution flow rates may range from about 25 milliliters/minute to about 100 liters/minute or more. Preferably, solution flow rate through the filter is from about 2 liters/minute to about 40 liters/minute to achieve a catalytic metal recovery of from greater than 95% to about 100% by weight. Flow rates exceeding 300 liters/minute may cause certain filters, such as the polymer and cellulose filters, to tear resulting in significant loss of catalytic metal. Differential media pressures employed in apparatus used to filter catalytic metal colloids from fluids may range from about 5 psi to about 50 psi (pounds per square inch), preferably from about 15 psi to about 35 psi. If differential media pressure is not high enough, filtering is prolonged and unwanted components from the fluid remain on the filter. If differential pressure exceeds 50 psi, filters such as the polymer filters may tear or the size of their pores may increase resulting in loss of catalytic metal.

One embodiment of the present invention employs a filter apparatus 10 as shown in the FIGURE. Apparatus 10 contains filter housing 12 with air tight screw top lid 14 and hollow filter 16 composed of a fibrous material such as polypropylene and secured to the bottom of apparatus 10 with tubesheet 18. A pump (not shown) removes fluid containing catalytic metal colloids from a container (not shown) and drives the fluids (as indicated by arrows) into apparatus 10 through inlet line 20. Fluid from inlet line 20 passes through cavity 22 of filter 16 and out through the fibers of filter 16 as shown by arrows. Cap 28 at the bottom of filter 16 prevents fluid from passing out through the bottom of filter 16. Catalytic metal colloids are concentrated on the inner surface and within the fibers of filter 16. The fluid with other components still dissolved pass into space 24 and then the fluid passes out of apparatus 10 through outlet 26 to another container (not shown) where the fluid undergoes standard waste treatment. Fluid flow from inside the filter to the outside of the filter is known as inside/outside flow method. Pressure gauge 30 measures media differential pressure within apparatus 10. While the FIGURE shows one filter housing, as many as four or more such filters may be joined in parallel with operation of from one or more filters at a time. Such filter housings may have overall dimensions of about 48 inches wide×78 inches long×51 inches high (2.54 cm/inch). To achieve optimum recovery of catalytic metal the outflow fluid rate preferably is equal to or greater than the fluid flow rate into the filtering apparatus. A suitable flow rate range may be from about 2 liters/minute to about 40 liters/minute for an apparatus as shown in the FIGURE. Preferably, the flow rate is from about 2 liters/minute to about 30 liters/minute. Generally, when the outlet flow rate is reduced to about 75% to about 85% of its initial flow, the filters are deemed loaded. New filters are then placed in the filter housing to continue the filtration process. Such outlet flow rates may vary.

After the filtration step the filter containing the catalytic metal colloids is burned by any suitable means such that the catalytic metal desired for recovery is left intact. Other non-catalytic metals may be present after filter burning as well. An example of such a metal is tin. The filter is burned to separate the filter from the catalytic metal. Burning or incinerating the filter oxidizes the catalytic metals and any non-catalytic metals. For example, in the case of tin/palladium colloid, the palladium and tin are oxidized to palladium oxide and tin oxide.

Filters may be burned or incinerated in any type of oven or apparatus used for burning that can reach temperatures of at least about 1000° F. or greater. Preferably incinerating temperatures range from at least about 1100° F., more preferably from about 1200° F. to about 3000° F. Incineration times may range from about 1 hour to about 30 hours, preferably from about 5 hours to about 20 hours. (Convert to degrees centigrade with formula: ° C.=5/9(° F.−32).)

In one embodiment of the present invention filters, such as polypropylene filters, containing catalytic colloids of Sn/Pd are placed in a high temperature oven such as a thermal induction furnace. A preheat cycle of from about 1000° F. to about 3000° F. preferably of from about 1650° F. to about 2250° F. is initiated by turning on the incinerator afterburners. Such preheat cycle temperatures ensure an adequate incineration rate. After the preheat temperature has reached an optimum range of from about 1000° F. to about 3000° F. the main burner is turned on. When the main burner reaches a temperature of about 200–350° F. the main burner is turned off. By turning the main burner off, the filters are allowed to burn with diminished amounts of oxygen such that the initial filter burning does not accelerate too rapidly and cause fumes to escape into the workers environment. The amount of oxygen varies depending on the type of incinerator used and the amount of material to be burned. Such amounts of oxygen may be readily determined by one of skill in the art. The oxygen starvation cycle is run for a time period of from about 1 to about 4 hours. The main burner is then turned on to a temperature of from about 500° F. to about 900° F. Underfire air is then introduced into the incinerator. The temperature in the incinerator is allowed to reach levels of from at least about 1000° F. or greater. The incinerator may then be run for a period of from about 1 to about 5 hours. The main burner is then turned off and the underfire air is increased and allowed to run over night. The increase in underfire air varies depending on the apparatus used and the amount of a material to be burned. Such increases in underfire air may be determined by one of skill in the art. After the incineration cycle is completed, the resultant burnt material or ash containing the catalytic metals is removed and processed to recover or separate the catalytic metal from the ash. The ash composes burnt filter material as well as catalytic metal and non-catalytic metal in oxide form. The catalytic metal oxide composes from about 0.5% to about 2.0% by weight of the ash with the remainder non-catalytic metal as an oxide and burnt filter material.

Optionally, the ash may be milled to fine particles in the range of from about 10 μm to about 50 μm in diameter. Such milling may be performed with any suitable apparatus such as a ball mill. Milling may range from about 0.5 hours to about 5 hours, preferably from about 1 hour to about 2 hours. Milling reduces particle ash size for further processing of the catalytic metal recovery. After milling, the ash may be blended to reduce ash particle size even further. Blending may be performed with any suitable apparatus such as a 50 to 100 mesh screen. After such treatment the ash may be referred to as sweeps or fines. Sweeps or fines have particle sizes of less than about 50 μm to as high as about 1,000 μm, preferably from about 200 μm to about 500 μm. (The expression μm=microns.)

Advantageously, the catalytic metal colloids concentrated on the filter may be completely processed and retrieved at the site of dragout recovery, or economically and safely transported to another site for incineration. Transportation to another site for subsequent recovery no longer involves moving large volumes of fluids to distant sites. Thus, the chances of polluting the environment with hazardous waste due to spills are eliminated. Also the cost of transport is less because less weight is involved and more of the catalytic metal colloid can be transported in one load because the colloid components are concentrated on a filter.

Catalytic metal (predominantly in oxide form) may be recovered from the ash or fines by any suitable method in the art. A preferred method is employing an adsorbent. Prior to recovering a catalytic metal with an adsorbent, the oxide form of the catalytic metal is solubilized for better recovery. The oxide form of the metal is converted to the ionic form. Suitable solubilizing compositions include halogen containing compositions such as HCl mixed with $H_2O_2$, and HBr or mixtures thereof. For example, PdO when treated with HCl/$H_2O_2$ (about 75% by weight of about 6 M HCl and about 25% by weight $H_2O_2$) or about 6 M HBr is solubilized. Palladium when solubilized is in $Pd^{2+}$ form. HBr is preferred especially for treating PdO. HCl and HBr may have concentration ranges of from about 1 M to about 10 M.

Any material that adsorbs catalytic metals may be employed to adsorb the catalytic metal ions. Such adsorbents are well known in the art, and vary in their ability to adsorb a specific metal. The various resins such as the crown ethers and the nonionic borane reducing resins described above are suitable for adsorbing many catalytic metals, especially the noble metals of gold, platinum and palladium. Examples of commercially available nonionic borane reducing resins are the Amborane® resins. Examples of commercially available crown ethers are the SuperLig® resins (obtainable from IBC Advanced Technologies Inc., American Fork, Utah). Preferred resins for recovering the catalytic metal ions are the crown ethers. Such resins are preferred for recovering precious metals such as gold, rhodium, platinum and palladium, especially palladium. Advantageously, because salts are separated from the catalytic metal colloids during the solids filtration step, less nonionic borane reducing resin can be employed in recovering the catalytic metals. Salts, especially salts containing chloride ions, may cause the resins to collapse. The collapse of the resins reduces the ability of the resins to adsorb and bind the metal ions. Thus, when solutions having significant quantities of salt are contacted with the resin, excess resin is employed to avoid the loss of catalytic metals. Because the method of the present invention removes the salts, the amount of resin employed may be reduced from about 10% to about 40% of the amount that metal recovery requires with a salt containing composition. In addition to the improved efficiency of using less resin for recovery, the cost of performing the recovery with such resins is reduced. The nonionic acrylic based amine-borane and phospine-borane reducing resins are costly. Thus, the method of the present invention is a more economically efficient method of employing such resins.

The catalytic metals may be retrieved from the adsorbent by any suitable means and optionally further processed by known methods in the art. For example, catalytic metals on the nonionic borane reducing resins may be retrieved by burning the resins followed by recovering the catalytic metal by smelting. Suitable smelting methods are well known in the art. Alternatively, when crown ethers are used, the catalytic metal may be eluted with a buffer. An example of a suitable buffer is ammonium hydroxide. The method of the present invention recovers greater than 90% by weight of the initial catalytic metal in the fluid.

Advantageously, the method of the present invention provides for an efficient method of recovering catalytic metals from a fluid especially rinse solutions where catalytic metals are in dilute concentrations. In addition to the other advantages mentioned above, the method of the present invention provides for a higher catalytic metal recovery than using filters to trap catalytic metal colloids followed by using harsh oxidizers to strip catalytic metals from the filters. Such recovery methods often remove only from about 50% by weight to about 85% by weight of the catalytic metal from the filters. To achieve higher recovery of catalytic metal ions, stripping is often repeated a number of times. Such a method is time consuming, and repeated use of harsh oxidizing agents is hazardous to workers. Sometimes even repeated stripping of the filter with an oxidizing agent does not remove much more than about 85% of the catalytic metal. The method of the present invention eliminates the repetitious harsh oxidizing steps and also provides for an improved catalytic metal recovery by concentrating the catalytic metal colloid on a filter followed by burning the filter.

Although the present invention is described with an emphasis on recovering catalytic metal from dilute aqueous rinse solutions in the printed circuit and wiring board industry, the method of the present invention may be employed in the recovery of catalytic metal from dilute aqueous solutions in other industries.

The following example is intended to further illustrate the present invention and is not intended to limit the scope of the invention.

EXAMPLE

A tin/palladium colloid was recovered from an aqueous dragout bath from a rinse tank with the composition described below. All percentages are by weight.

1. 0.6% Sodium Bisulfate ($NaHSO_4$)
2. 0.05% Carbamic Acid
3. 3.8% Chloride Compounds
4. 0.0025% Palladium Chloride
5. 0.083% Stannous Chloride
6. 95% Deionized Water When all of the above components were combined in the deionized water, a precipitate of tin/palladium colloid formed. The weight ratio of tin (stannous and stannic ions) to palladium was about 33:1. The dragout bath was filtered in a continuous mode using a four housing filtration unit that employed 1 μm polypropylene filter bags to collect the precipitate of tin/palladium colloids. Much of the tin passed through the filter. The output or components of the dragout bath that passed through the filter bags from the collection unit was verified at least twice per day. Each time the output was analyzed for palladium the results were close to zero indicating that almost all of the palladium, i.e., about 99% by weight, from the dragout bath was retained on the filter. Palladium metal analysis was done by atomic absorption technology (absorption apparatus manufactured by Varian). Each filter bag was run until completely loaded with the tin/palladium colloid components as determined by a maximum pressure in the housing. Each time the housing reached maximum/terminal pressure new bags were placed in the housing and the cycle of loading the filters was repeated. The process was continued until a 55 gallon (208 liters) drum was filled with bags.

The 55 gallon drum filled with bags was shipped to another site for incineration. All the filled bags were placed in an incinerator. The incinerator employed was a thermal induction furnace manufactured by Ventamatic (such furnaces are also obtainable from American Gas Furnace). Afterburner temperatures in the incinerator were set to about 2000° F. When the main burner temperature reached about 263.5° F. the main burner was shut off for about 2 hours. After about 2 hours the main burner was turned back on and the underfire air was initiated. The temperature in the incinerator then stabilized at about 1150° F. After about 3 hours the main burners and afterburners were shut off and the underfire air was increased. The incinerator was left in this mode overnight. The next morning the incinerator temperature decreased to about 145° F., and the ash in the incinerator was removed.

The ash was then processed through a ball mill for about 1 hour to reduce the ash particle size. The ash was then blended through a 70 mesh screen for about 2 hours to further reduce particle size. The resulting material called sweeps or fines contained palladium as palladium oxide. The fines were then treated with about 6 M HBr solution to solubilize palladium oxide. The palladium metal ions were recovered from the solution by adsorbing the palladium metal ions onto a crown ether resin followed by eluting the palladium from the resin with an ammonium hydroxide solution. About 98% by weight of the palladium from the dragout bath was recovered as determined by atomic absorption technology.

What is claimed is:

1. A method of recovering catalytic metal from a fluid comprising:
   a) concentrating catalytic metal colloids as a precipitate on a filter; then
   b) incinerating the filter containing the precipitate to form an ash and to oxidize the catalytic metal of the catalytic metal colloid; and then
   c) retrieving the catalytic metal from the ash with an adsorbent.

2. The method of claim 1, wherein greater than 90% by weight of the catalytic metal is recovered from the fluid.

3. The method of claim 1, wherein the catalytic metal comprises copper, beryllium, aluminum, tungsten, tellurium, nickel, silver, germanium, molybdenum, selenium, rhodium, osmium, iridium, ruthenium, lead, magnesium, gold, platinum, palladium, or mixtures thereof.

4. The method of claim 3, wherein the catalytic metal comprises gold, rhodium, platinum or palladium.

5. The method of claim 1, wherein the filter comprises a thermoplastic polymer, hydrophilic material, activated carbon, silica gel, alumina, silica-alumina, silicon carbide, zirconium silicate, diatomacious earth, or mixtures thereof.

6. The method of claim 5, wherein the thermoplastic polymer comprises polyolefins, polyamides, polyesters, polycarbonate, polystyrene, thermoplastic elastomers or blends and copolymers thereof.

7. The method of claim 1, wherein the fluid is an aqueous rinse or dragout bath from a printed circuit board.

8. The method of claim 1, wherein the catalytic metal comprises from about 0.0001% by weight to about 0.05% by weight of the fluid.

* * * * *